United States Patent [19]

Lefkowitz

[11] Patent Number: 4,524,348
[45] Date of Patent: Jun. 18, 1985

[54] CONTROL INTERFACE

[76] Inventor: Leonard R. Lefkowitz, 14 Alpine Dr., Latham, N.Y. 12110

[21] Appl. No.: 535,813

[22] Filed: Sep. 26, 1983

[51] Int. Cl.³ .............................................. G08C 9/00
[52] U.S. Cl. .................................. 340/365 R; 178/18; 340/706; 340/724
[58] Field of Search .......... 340/365 R, 365 C, 365 P, 340/706, 709, 870.37, 724, 725; 178/18, 19, 20; 273/85 R, 313

[56] References Cited

U.S. PATENT DOCUMENTS

| | | |
|---|---|---|
| 1,661,058 | 2/1928 | Theremin . |
| 2,438,197 | 3/1948 | Wheeler . |
| 3,421,106 | 1/1969 | Garber . |
| 3,421,374 | 1/1969 | Wieting . |
| 3,614,651 | 6/1969 | Pasquier . |
| 3,843,924 | 10/1974 | Wahlgren ....................... 340/870.37 |
| 4,071,691 | 1/1978 | Pepper, Jr. . |
| 4,103,252 | 7/1978 | Bobick . |
| 4,142,180 | 2/1979 | Burson . |
| 4,149,716 | 4/1979 | Scudder ............................. 340/706 |
| 4,206,314 | 6/1980 | Prugh .................................... 178/19 |
| 4,209,255 | 6/1980 | Heynau ............................... 340/709 |
| 4,245,244 | 1/1981 | Lijewski ............................. 340/709 |
| 4,293,734 | 10/1981 | Pepper, Jr. . |
| 4,301,447 | 11/1981 | Funk ................................... 340/706 |
| 4,303,914 | 12/1981 | Page ..................................... 340/706 |
| 4,317,005 | 2/1982 | de Bruyne ............................. 178/19 |
| 4,353,552 | 10/1982 | Pepper, Jr. . |
| 4,414,537 | 11/1983 | Grimes ............................. 340/365 C |
| 4,423,286 | 12/1983 | Bergeron .............................. 178/19 |

OTHER PUBLICATIONS

Garner, "For That Musical Sound", *Popular Electronics*, Nov. 1967.
Trythall, *Principles and Practice of Electronic Music*, 1973.
Crowhurst, *Electronic Musical Instruments*, 1971.
Douglas, *The Electronic Musical Instrument Handbook*.
Jenkins and Smith, *Electric Music*, 1975.
Griffiths, *Electronic Music*, 1979.
Assembly for Model #142 Theremin.

*Primary Examiner*—James J. Groody
*Assistant Examiner*—Michael F. Heim
*Attorney, Agent, or Firm*—Witherspoon & Hargest

[57] ABSTRACT

A control interface between a physical object, such as a part of the human body, and a machine. Movement of the physical object in a defined field is sensed, and signals corresponding to such movement are received, detected, amplified and produced as an input signal to the machine to move an element of the machine in the same direction as, and in an amount proportional to, movement of the object. In one embodiment the machine is a video game system and the element is a display signal.

11 Claims, 6 Drawing Figures

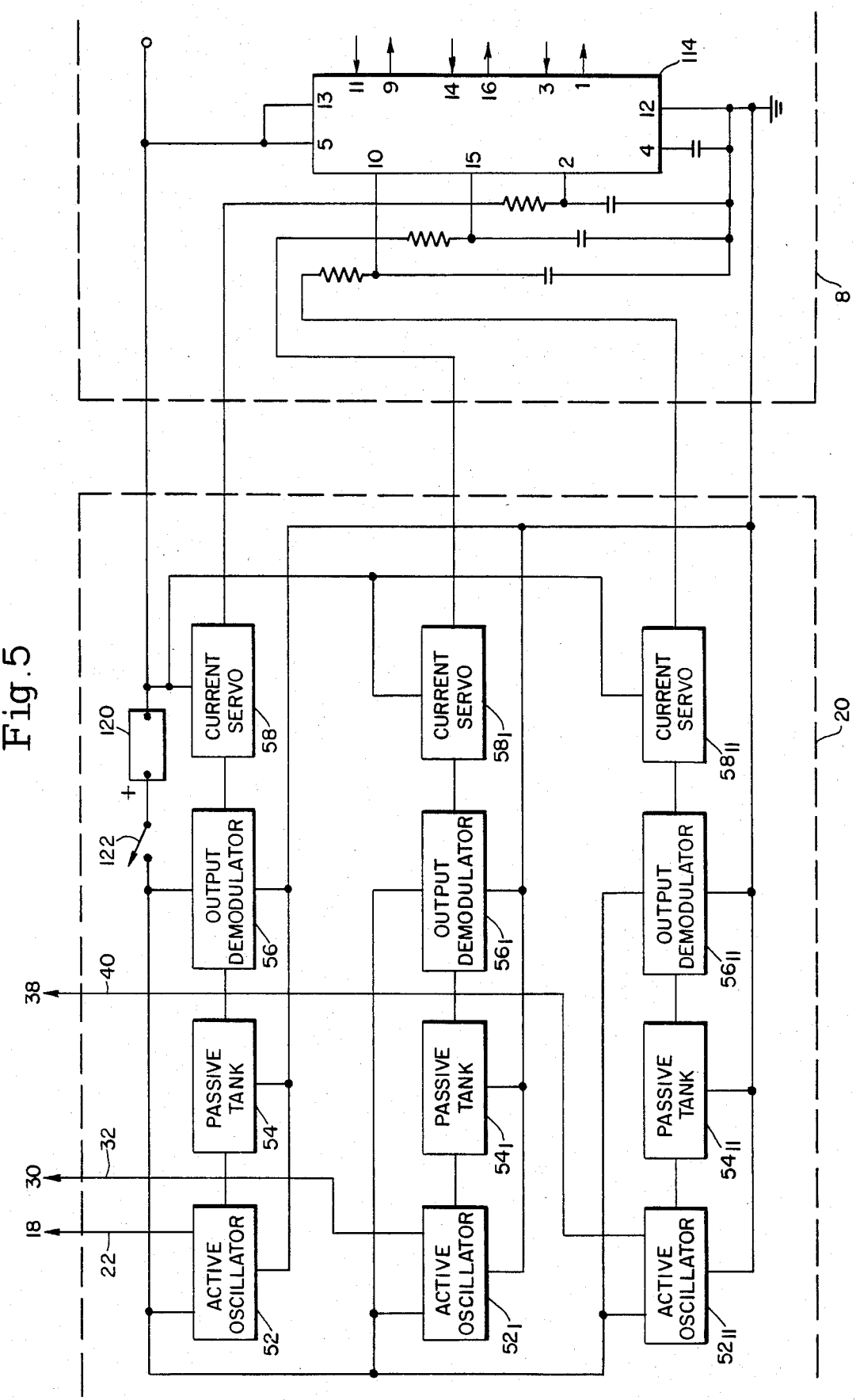

CONTROL INTERFACE

BACKGROUND OF THE INVENTION

The present invention relates to operator control of an element of a machine through a control interface without any direct contact with the control interface. The practice of this invention is applicable to any machine having an element associated therewith which may be caused to move in response to signals received by the machine from a control interface. For example, the invention is applicable to any machine having an element which is caused to move in response to signals received by the machine's microcomputer or microprocessor from such a control interface. The term machine is broad enough to cover, without limitation, construction equipment wherein the moveable element is a moveable arm, boom, scoop, bucket and the like, or any other equipment wherein an element of the equipment is caused to move in response to signals originating at a control interface as described herein. The invention is equally applicable to computer systems wherein the moveable element is a signal displayed on a cathode ray tube (CRT), such systems including, without limitation, video games and the like. For purposes of illustration the invention will be described in terms of a video system, it being understood that the teachings herein are equally applicable to operator control of an element of any machine.

Generally video systems comprise a primary unit which is coupled to a television set at its antenna terminal. At least one control unit is coupled to such primary unit as, for example, by cables. Typical of such control units are those which comprise a joystick-type control lever such as is described in U.S. Pat. No. 4,142,180 in the name of Burson. Such devices allow for operator control of the movement of various video images on a video display screen such as the CRT of a television set. For example, one form of video system involves plugging a game module into a primary unit. Such game module may include a microprocessor or microcomputer which operates in accordance with a stored program. Upon activation of the game system, movement of the joystick causes corresponding movement of a video image. For example, in a simulated video game of TV tennis a simulated ball moves back and forth across the CRT in a manner determined by the stored program. A player or players attempt to hit the ball back and forth with a simulated racket or paddle which is caused to move by operator movement of the joystick control. Movement of the joystick along one axis such as the x-axis may cause corresponding movement of the paddle along an x-axis on the CRT, and movement of the joystick along another axis such as the y-axis may similarly cause corresponding movement of the paddle along a y-axis on the CRT.

In one type of control unit, a joystick, control knob, and the like, forms part of a self-contained unit which may be held in one hand while the joystick, knob, etc. is operated by the other hand. Such a structure is cumbersome to use. In addition, continuous use of such a structure causes both hands to tire after extended use. Some games involve operator controlled movement of a video image and operator controlled firing of a simulated missile-like object at some other video image on the CRT. Such firing may require depressing a button mounted on the control unit or on the joystick and involves a cumbersome exercise when the attention of the operator is divided between operation of the joystick and the missile button, and the holding of the control unit per se. It is an object of the present invention to provide for operator control of movement of an element of a machine such as, for example, movement of video images on a video display screen but which does not require that the operator hold or touch any part of a control unit during its use.

Known control units comprise parts which require movement relative to each other during operation thereof. For example, the joystick discussed herein is caused to pivot along an x-axis or y-axis or combination thereof during use. It is a further object of the present invention to provide an operator control unit which does not comprise parts which move relative to each other.

The operation of hand operated control units such as, for example, joysticks, or touch sensitive control units as described in U.S. Pat. Nos. 4,071,691 and 4,353,552 in the name of Pepper, Jr. requires a "physical sense" or "feel" on the part of the operator. Such sensitivity extends from the hand to the control unit. In essence, the operator actually must physically sense or feel the movement of the joystick or finger or hand relative to the control unit during the positioning of the paddle or other moveable video image. This can provide a problem, particularly when the control unit is in one hand and the joystick is controlled by the other hand and both the unit and the stick are in motion during use. Another object of the present invention is to provide for operator control of movement of an element of a machine such as, for example, movement of video images on a video display screen but which does not require that the operator actually physically sense or feel the movement of one part of a control unit or part of the body relative to the control unit.

The foregoing problems and objects are also applicable to other types of machines wherein movement of a machine element is caused in response to signals received by the machine from a control interface similar to those discussed above. In particular, such problems and objects are applicable to construction equipment and other equipment, including without limitation other video equipment, wherein an element of the equipment is caused to move in response to signals originating at a control interface as described herein.

SUMMARY OF THE INVENTION

These and other objects are achieved by the present invention which relates to a control interface between a moveable physical object and a machine. The interface allows movement of an element of the machine in response to movement of the physical object without any direct physical contact of the object with the interface. Movement of the object causes the element to move in the same direction as, and in an amount proportional to, object movement. In this manner, the element may be caused to move along one or more axes including an x-axis, a y-axis or a z-axis, or any combination thereof.

In one embodiment the control interface is coupled to a microcomputer or microprocessor of the type typically in use in video games and is used in determining the play of the game. In particular, the interface allows a game operator to control the spatial position of a display signal on the face of a cathode ray tube (CRT) by movement of the operator's hand or other part of the body within a defined field. Such movement is sensed, and the position of the operator's hand is detected relative to the confines of the defined field. An input signal to the microprocessor or microcomputer is produced which is a function of the movement of the operator's hand in the defined field and which causes movement of the display signal in the same direction as, and in an amoumt proportional to, movement of the operator's hand.

Means may be provided for causing movement of such a display signal along one or more axes, including movement along an x-axis or a y-axis, simulation of movement of such a display signal along a depth or z-axis to give the display signal a three-dimensional appearance, or any combination thereof.

BRIEF DESCRIPTION OF THE DRAWINGS

This invention may be clearly understood by reference to the attached drawings in which.

DESCRIPTION OF THE PREFERRED EMBODIMENT

Figure 1:
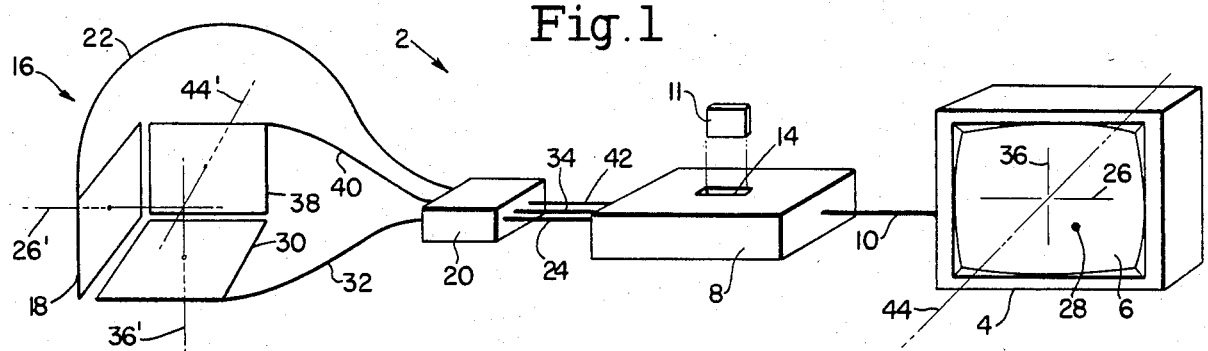
FIG. 1 is a perspective view of a video game system embodying the present invention.
Figure 2A:
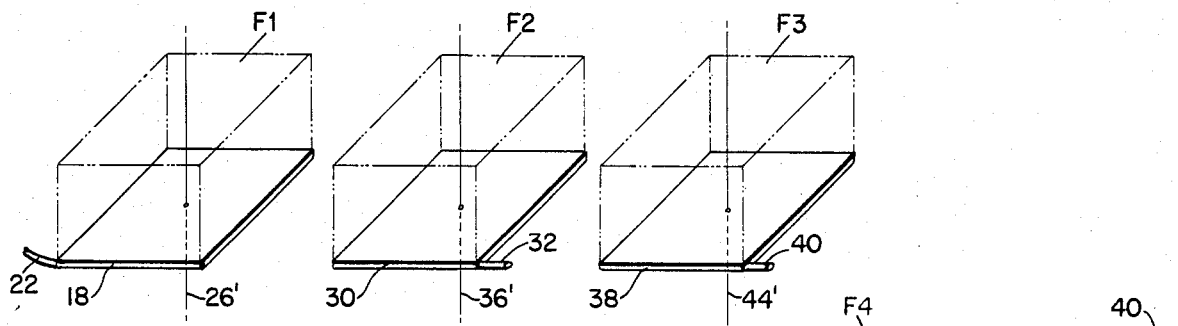
FIGS. 2a and 2b are perspective views of a sensing and signalling means utilized in the video game system of FIG. 1.
Figure 2B:
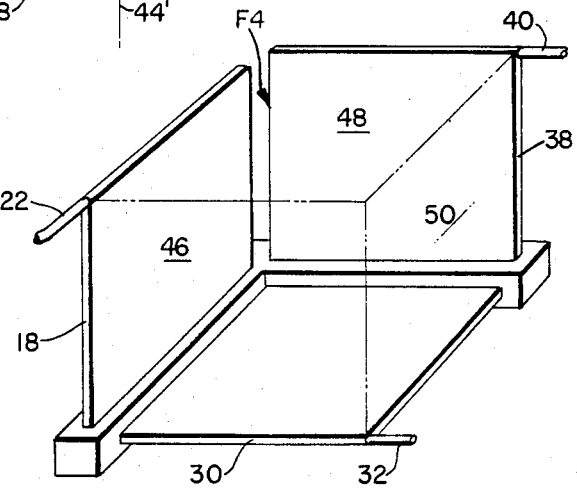

The embodiment which is illustrated in FIGS. 1 and 2b is one which is particularly suited for achieving the objects of this invention. FIG. 1 depicts a video game system 2 comprising a typical television set 4 including a CRT 6. A video game module 8 is coupled to the television set 4 by one or more conductors or cables 10 in a known manner. For example, module 8 may be coupled to the television set 4 at the antenna terminal of the set. In order to select a game for playing, the desired game cartridge 11 is plugged into socket 14 in a known manner as described, for example, in the Burson patent. Operator control of the game is accomplished by means of a control interface generally designated 16 which comprises a control panel 18 coupled to module 8 through control module 20 by one or more conductors or cables 22 and 24.

For purposes of explanation, CRT 6 is depicted as having an x axis 26. Similarly, control panel 18 is depicted as having an x axis $26^1$ which is generally perpendicular to the surface of panel 18. When playing the video game identified by cartridge 11, it may be desirable to control the position of a display signal 28 on the face of CRT 6. In the embodiment depicted in FIG. 1, the operator positions a part of the body such as a hand, or some other moveable physical object, above the surface of panel 18 as described in more detail hereinafter. Movement of the hand in a direction identified by x axis $26^1$ towards or away from panel 18 causes the display signal 28 to move proportionally on the face of CRT 6, preferably in a corresponding direction, identified by x axis 26. It will be apparent to those skilled in the art that if desired the circuitry herein may be modified such that movement of the object in one direction causes movement of the element, which in this embodiment is a display signal, in an opposite direction. However, preferably movement of the object and element will be in the same direction.

In playing some games it may be desirable to control movement of the display signal 28 along other axes. For example, the control interface 16 is depicted as further comprising a control panel 30 coupled to module 8 through control module 20 by one or more conductors or cables 32 and 34. CRT 6 is depicted as also having a y axis 36 and control panel 30 is depicted as having a y axis $36^1$ which is generally perpendicular to the surface of panel 30. To move display signal 28 on the face of the CRT 6 in a direction identified by y axis 36, the operator positions the hand above control panel 30 and moves the hand towards or away from panel 30 in a direction identified by y axis $36^1$. It will be apparent that the control interface 16 may include control panel 18 or control panel 30 or control panels 18 and 30, depending upon the desired direction of movement of display signal 28 upon the CRT 6. It will also be apparent that simultaneous movement of a part of the body or other physical object relative to both control panels 18 and 30 will cause display signal 28 to simultaneously move proportionally in the direction of the x axis 26 and y axis 36.

It is also possible to create a three-dimensional effect of the type, for example, presently in use in three-dimensional type video games, upon the CRT 6 by means of the present invention. In particular, and by way of example only, it is possible to give a display signal 28 the appearance of moving closer to or farther away from the operator by providing a control panel 38 coupled to module 8 through control module 20 by one or more conductors or cables 40 and 42. To illustrate such an effect, the CRT 6 is depicted as having a z axis 44 which is generally perpendicular to the viewing surface of the CRT 6. Similarly, control panel 38 is depicted as having a z axis $44^1$ which is generally perpendicular to the surface of panel 38. When an operator moves the hand toward the control panel 38 generally in the direction of the z axis $44^1$, the display signal 28 will preferably have the appearance of moving farther away from the operator in the general direction of the z axis 44. Correspondingly, when an operator moves the hand away from the control panel 38 generally in the direction of the z axis $44^1$, the display signal 28 will preferably have the appearance of moving closer to the operator in the ganeral direction of the z axis 44.

From the foregoing, it will be apparent that control panels 18, 30 and 38 may be used individually or combined in any manner as desired. When panels 18, 30 and 38 are used together, the operator may simultaneously control movement of the display signal 28 in any of two dimensions; that is, the x and y dimensions. At the same time the operator may cause the display signal to have the appearance of being controlled in a third dimension; that is, the z dimension.

In the present invention a control interface is provided between a moveable physical object and a machine. In the embodiment described concerning FIG. 1, the physical object is a part of the body and the machine is a video game module and television set. No matter what environment the present invention is used in, however, the control interface comprises means for sensing and signalling the movement of the physical object in a defined field, means coupled to the sensing and signalling means for receiving said signalling, means coupled to the receiving means for detecting the position of the object relative to the confines of the field, and means coupled to the detecting means for producing an input signal to the machine to move an element of the machine preferably in the same direction as, and in an amount proportional to, the movement of the object.

In the preferred embodiment, the sensing and signalling means will comprise at least one antenna. Also preferably each antenna will be a plate-like structure. For example, the sensing and signalling means of FIG. 1 is shown as comprising control panels 18, 30 and 38, each of which is a plate-like antenna. A more detailed view of each control panel is depicted at FIG. 2a. Each antenna has a defined field associated with it which extends outwardly from the surface of the plate-like structure. As shown in FIG. 2a, the antennae 18, 30 and 38 may be spaced from each other such that the defined fields F1, F2 and F3 are independent of each other. Alternatively, the antennae may be positioned such that the fields of each plate used merge to form a common defined field. For example, in those embodiments in which an antenna 18 and 30 are used as depicted in FIG. 2b, a defined field is associated with each plate-like structure, the fields F1 and F2 of plates 18 and 30, respectively, merging to form a defined field which is common to both antennae. Similarly, if antenna 38 is also used, a similar field F3 is associated with the plate-like structure of antenna 38, the defined fields of panels 18, 30 and 38 merging to form a defined field which is common to all three antennae such as the common field F4 of FIG. 2b, the confines of which include panels 18, 30 and 38 and imaginary planes 46, 48 and 50. In the embodiment of FIG. 2b, the movement of a physical object, such as the hand of an operator, within the defined field F4 is sensed by the antennae 18, 30 and 38 which send signals representative of such movement to the interface module 20 by means of cables 22, 32 and 40, respectively. In particular, plate-like antenna 18 senses and signals the movement of the hand in the defined field along x axis $26^1$, antenna 30 senses and signals the movement of the hand in the defined field along y axis $36^1$, and antenna 38 senses and signals the movement of the hand in the defined field along the z axis $44^1$.

Although not necessary, in the preferred embodiment each antenna is disposed at an angle of 90° relative to each other antenna. For example, antennae 18, 30 and 38 are disposed at an angle of 90° relative to each other to form the open box-like structure of FIGS. 1 and 2b, the defined field F4 being within the "box".

Although not necessary, and without limitation, the control panels of FIGS. 2a and 2b are preferably constructed such that the defined field associated with each panel may extend from the surface of such panel a distance of four to eighteen inches. As shown in the drawings, no control panel contacts any other panel although in the embodiment of FIG. 2b the gap between panels is minimized to avoid losing sensitivity in any dimension. It will be apparent to those skilled in the art that in the box-like embodiment of FIG. 2b, movement of the hand towards antenna 38 will to some extent also affect antennae 18 and 30 if for no other reason than the fact that more surface area of the hand will be in the box. In use, the operator can learn to tolerate or even physically compensate for the effect of the presence of such additional surface area. Alternatively, such effect may be electrically biased out of the system or otherwise compensated for by using computer programming which corrects any bias caused by such additional surface area. Of course, the actual design or configuration of the sensing and signalling means may be such as to minimize if not eliminate any bias as desired.

Although not necessary, in the preferred embodiment the antennae 18, 30 and 38 each comprise a plate-like structure having a metal facing on the side nearest the defined field. Electrically coupled to the metal facing of each antennae 18, 30 and 38 is one end of a conductor 22, 32 and 40, respectively, each of which may comprise a shielded or insulated antenna cable the opposite end of which is electrically coupled to the control module 20 as described herein.

Accuracy may be improved, if desired, by the use of additional plates. For example, a plurality of plates which form a pentagonal array of surfaces and enclose a defined field may be useful in improving accuracy. In another embodiment, a pair of opposing plates may be used to identify a defined field therebetween. For example, by positioning an additional plate spaced from and parallel to plate 18, a defined field is identified between such two plates. By coupling each plate by a separate cable 22 to the interface module 20, movement of an object within the defined field will produce two responses which may be summed together in a known manner, the summed signal being respresentative of such movement and being sent to the interface module 20.

Other arrangements and configurations of the sensing and signalling means of the present invention are possible, it not being intended to limit the present invention to the specific arrangement shown in FIGS. 2a and 2b, or to the use of any particular quantity of such means, or to the use of plate-like panels or antennae of any particular shape or form, or to the use of an antenna per se. It is intended that the present invention be broad enough to include any type of means for sensing and signalling the movement of a physical object in a defined field extending from such sensing and signalling means.

In addition to the sensing and signalling means, the control interface of the present invention also comprises means coupled to the sensing and signalling means for receiving said signalling. Preferably the receiving means comprises a pair of members, having initially identified measurable quantities such as, without limitation, initially identified, frequency, voltage or current, associated with a corresponding sensing and signalling means. One of such members of each pair is coupled to the sensing and signalling means to which that pair is associated and is varible so that in response to movement of the object in the defined field there is (a) a change from the initially identified measurable quantity of such variable member and (b) production of a corresponding difference signal by such variable member. In those instances where two or more sensing and signalling means are positioned such that their respective defined fields merge or overlap to form a common defined field as is the case, for example, regarding the embodiment depicted in FIGS. 1 and 2b, it is preferred that the measurable quantity of each separate receiving means, associated with each separate sensing and signalling means, be different. In this manner, it is possible to prevent erroneous signals caused by what may be referred to as "cross-talk" or interference caused by movement of an object in a defined field of one sensing and signalling means which is common to a defined field of another sensing and signalling means. Alternatively, the various receiving means could all have a uniform measurable quantity provided such quantity is emitted by each respective receiving means such that at any particular instant in time only one receiving means is in operation.

In the preferred embodiment the pair of members is a pair of oscillators such as, for example, a pair of ultrasonic oscillators, and the measurable quantity is frequency. A separate pair of such oscillators is associated with each antenna. One oscillator of each pair is coupled to its respective antenna and is detuneable to allow a change of frequency, and production of a corresponding difference signal by the detuneable oscillator, in response to movement of a physical object in the defined field. In those instances where two or more antennae are positioned such that their respective defined fields merge or overlap to form a common field such as, for example, field F4 of FIGS. 1 and 2b, it is preferred that the frequency of each pair of oscillators be different from the frequency of all other pairs of oscillators. In particular, as to any pair of oscillators associated with any antenna whose defined field forms part of a common field, it is preferred that the frequency originally emitted by both oscillators of such pair, as well as the altered frequency emitted by the detuneable oscillator of such pair, remain outside of the range of frequencies of any other pair of oscillators associated with any antenna whose defined field also forms part of such common field. Alternatively, originally emitted frequency as well as the altered frequency, of one pair of oscillators, could be the same as that of any other pair of oscillators provided that the emitted frequencies are chopped such that at any particular instant in time only one pair of oscillators is in operation. In order to assure continuity in each circuit, the time period of each chopped energizing signal must be short.

The control interface also comprises means for detecting the position of the moveable physical object relative to the confines of the defined field, which means may include detecting and amplifying the difference signal produced by the variable member such as the detuneable oscillator. The control interface also comprises means for producing an input signal to the machine to move an element of the machine preferably in a corresponding direction and in an amount proportional to such movement of the object, which means may adapt such amplified difference signal to control the element of the machine.

In the preferred embodiment, the circuitry of each receiving means, detecting means and producing means associated with each sensing and signalling means is housed in the interface module 20 and connected to its respective sensing and signalling means through cables 22, 32 and 40. In particular, interface module 20 houses each pair of members such as, for example, each pair of oscillators. One pair of oscillators includes a detuneable oscillator which is coupled to antenna 18 by cable 22. A second pair of oscillators includes another detuneable oscillator which is coupled to antenna 30 by cable 32. And a third pair of oscillators includes yet another detuneable oscillator which is coupled to antenna 38 by cable 40. The remaining circuitry associated with each pair of oscillators is also contained in interface module 20. When the difference signal associated with each antenna 18, 30 and 38 is detected, amplified and adapted to control the element of the machine such as to control the movement of the display signal 28, such adapted signal is carried by cables 24, 34 and 42, respectively, to module 8 to control such movement relative to axes 26, 36 and 44, respectively, as described herein.

Figure 3:
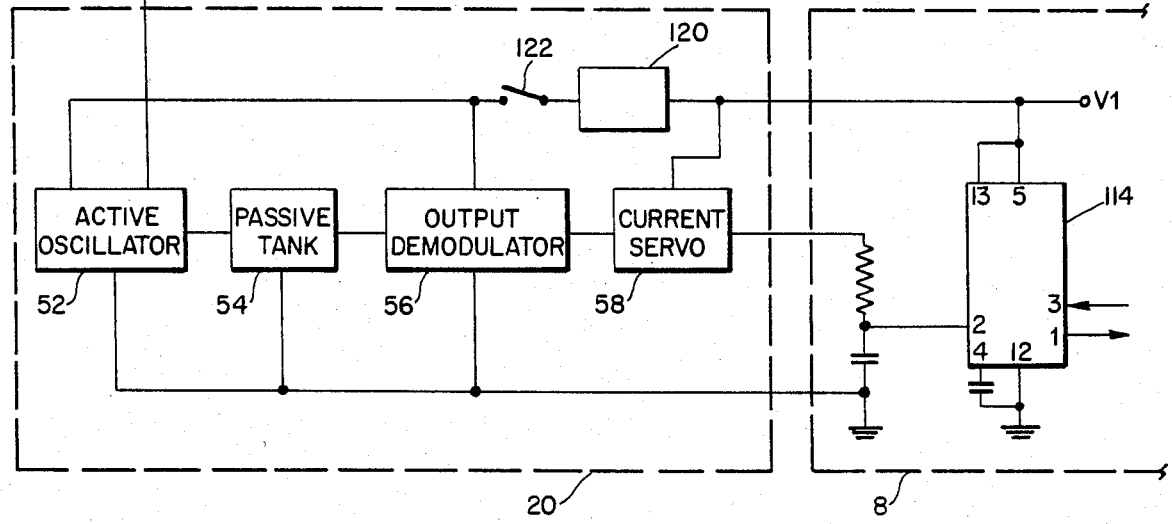
FIG. 3 is a block diagram of a one axis control interface embodying the present invention.

FIG. 3 is a block diagram of the preferred embodiment of the invention depicting a sensing and signalling means such as antenna 18 for use in controlling the movement of an element such as element 28 in a single direction such as along the x-axis 26. Antenna 18 is coupled to control module 20 by conductor or cable 22 which couples antenna 18 to the receiving means which comprises a pair of members having measurable quantities. In the embodiment of FIG. 3 the receiving means comprises a pair of oscillators 52 and 54, the measurable quantities being frequencies. One oscillator 52 is coupled to the antenna 18 and serves as an active variable oscillator. In particular, oscillator 52 is variable or detuneable to allow a change of frequency, and production of a difference signal by the detuneable oscillator, in response to movement of a physical object in the vicinity of antenna 18 which forms the defined field. The other oscillator 54 serves as a base oscillator or passive tank having a fixed frequency. In one embodiment, the unaltered frequency of the active oscillator 52 may be tuned to substantially the same frequency as that of the base oscillator 54. In such instances, the frequency of the active oscillator varies from such uniform frequency when a physical object moves within the defined field towards or away from antenna 18. In another embodiment, the unaltered frequency of the active oscillator 52 may be detuned or different relative to the frequency of the base oscillator 54 such that the two oscillators are brought progressively closer towards or further from matched frequency as an object moves within the defined field towards or away from antenna 18.

Means are provided for detecting the position of the object relative to the confines of the defined field. In the embodiment of FIG. 3 the detecting means comprises an output demodulator 56 which detects and amplifies the difference signal produced by the detuneable oscillator 52 operating in combination with the base oscillator 54.

Means is also provided for producing an input signal to the machine to move an element of the machine preferably in the same direction as, and in an amount proportional to, object movement in the defined field. In the embodiment of FIG. 3 the producing means comprises a current servo 58 which adapts the amplified difference signal for feeding to video game module 8. In operation, output demodulator 56 feeds the amplified difference signal in the form of a variable voltage to the current servo 58 which in turn feeds a variable current to module 8.

If desired, the receiving means may comprise a single member rather than a pair of members. In such an embodiment the antenna will be coupled to the single member which will in turn be coupled to the detecting means including a frequency to voltage converter. For example, a single detuneable oscillator may be provided which is coupled to antenna 18. Movement of the object in the defined field will cause the frequency of such oscillator to vary as explained above. Coupled to such oscillator will be means of the type known in the art which converts frequency to voltage. As the frequency of the oscillator varies in response to movement of the object in the defined field, the varied frequency will be converted to voltage which will be applied through the detecting means 54 to the current servo 58, current servo 58 functioning in the manner described above to facilitate movement of display signal 28.

Figure 4:
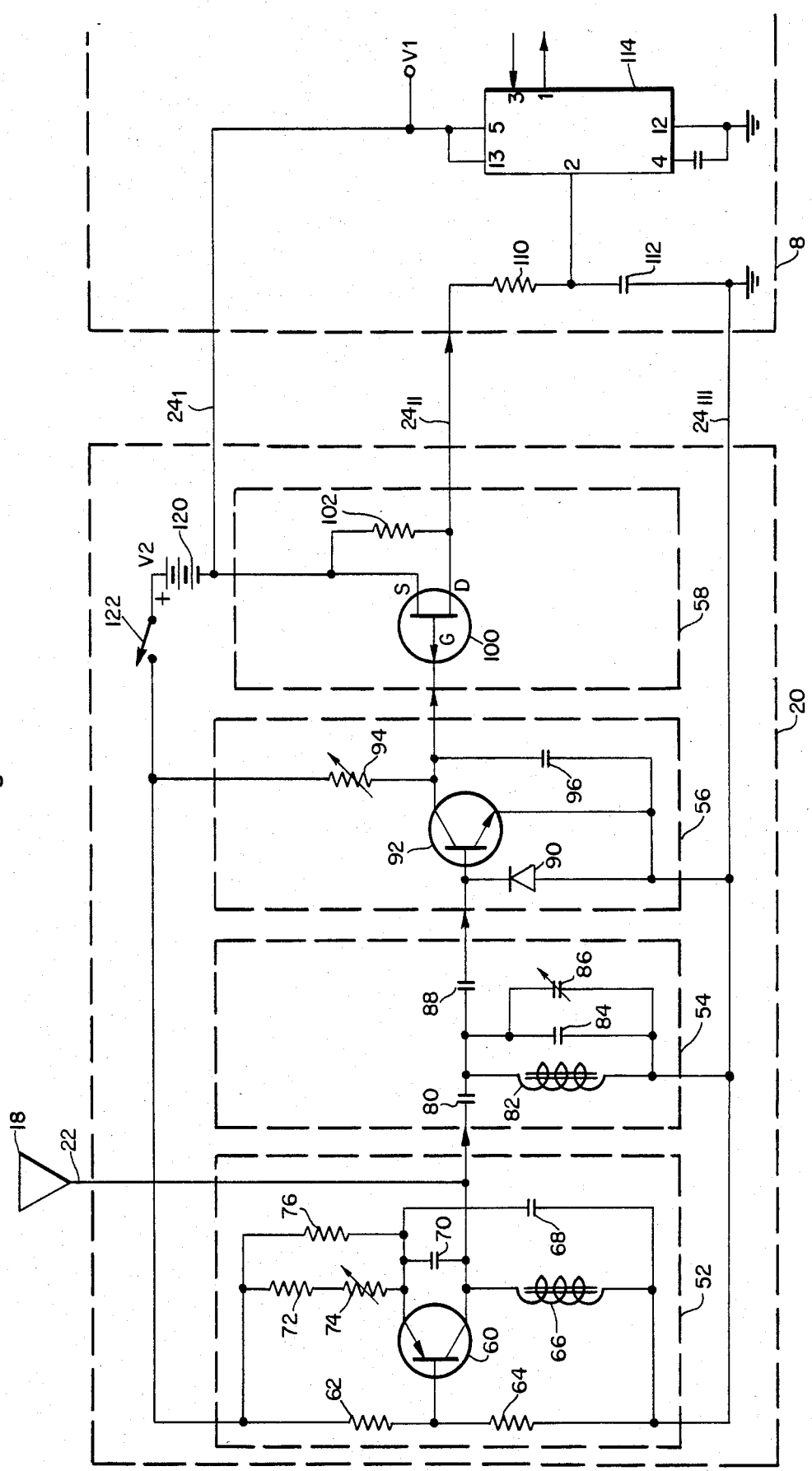
FIG. 4 is a schematic diagram of the circuitry depicted in the block diagram of FIG. 3; and, FIG. 5 is a block diagram of a three axis control interface, including the one axis control interface of FIG. 3, embodying the present invention.

FIG. 4 is a schematic diagram of the embodiment of the invention depicted in FIG. 3. FIG. 4 depicts antenna 18 electrically coupled to the active variable or detuneable oscillator 52 by means of conductor 22. The active oscillator 52 comprises a transistor 60, the base bias of which is established by a resistor voltage divider comprising resistors 62 and 64. The basic operating frequency is in the radio frequency region and is determined by the tuned circuit of fixed coil 66 and the combination of capacitors 68 and 70. However, the tuned circuit of transistor 60 is also connected to antenna 18. In operation, when the antenna senses a physical object such as a human hand placed in the defined field, the presence of the hand due to body capacitance is communicated to such tuned circuit of transistor 60 in the form of added capacitance to the combination of capacitors 68 and 70 causing an alteration in the frequency of the active oscillator. Such alteration is in the form of lowering the operating frequency of transistor 60. The combination of resistors 72, 74 and 76 provide some control over the amplitude of oscillation and such amplitude will be maximum when resistor 74 equals zero resistance. The active oscillator 52 is energized by voltage V2 which includes the voltage of battery 120 added to the voltage V1 of computer module 8.

The radio frequency signal of the collector of transistor 60 is coupled by means of capacitor 80 to the base oscillator of passive tank 54 comprising fixed coil 82 and capacitors 84 and 86. Capacitor 86 is useful in reducing the natural frequency of the passive tank to a value less than the basic frequency of operation of transistor 60. In the preferred embodiment, it is desirable to tune the peak-to-peak passive tank voltage to about 25% of the active oscillator peak-to-peak voltage which is fed to the passive tank through capacitor 80. In this manner, lowering of the frequency of transistor 60 when a human hand is placed in the defined field, causes voltage of the passive tank to increase several percent.

The voltage of the passive tank 54 is a radio frequency range, approximately sinusoidal, signal which alternates equally either side of zero volts. Although the peak-to-peak value of the tank voltage may go up or down in response to movement of the human hand in the defined field, such voltage maintains a zero D.C. level. The radio frequency signal across the base oscillator 54 is coupled by means of capacitor 88 to the output demodulator 56 such that such signal is rectified by diode 90, amplified by the transistor 92 and produced through capacitor 96 as a smooth D.C. voltage the level of which varies inversely with the peak-to-peak variation of the tank voltage. The output demodulator 56 is energized by voltage V2 which includes the voltage of battery 120 added to the voltage V1 of computer module 8.

The output voltage from the output demodulator 56 is fed to the gate G of a field effect device 100 of the current servo 58. The field effect device 100 is a transistor of the type whose gate G conducts negligible D.C. current. The current servo 58 is energized only by the voltage V1 of computer module 8. The device 100 is such that when the gate G voltage is about 5 volts higher than the source S voltage; that is, when the collector of transistor 92 is at 10 volts, the source S to drain D path provides a resistance such that little or no drain current can flow. On the other hand, when the gate G voltage is equal to source S voltage; that is, when the collector of transistor 92 is at 5 volts, the source S to drain D path provides little resistance and the device 100 has a drain current rating adequate for the next device. In this manner, the field effect device 100 serves as a voltage controlled resistor wherein an increase in capacitance at the active oscillator caused by the presence of a human hand in the defined field causes a corresponding increase in the passive tank point-to-point voltage and the transistor 92 base current and collector current, a corresponding decrease in the transistor 92 collector voltage, and a corresponding increase in the drain current of the device 100.

The circuitry of the current servo is designed to be compatable with the module 8 to be used. For example, the circuitry of the current servo 58 of FIG. 3 is designed to be compatable with input ports of an Apple II Plus Computer manufactured by Apple Computer, Inc. of Cupertino, Calif. Such a module comprises an input circuit resistor 110 and a discharge capacitor 112 on each of up to four timing devices 114, each of which is used identically and only one of which is therefore described herein. By way of example, device 114 is depicted as a 558 quad timer. The module 8 provides a means to alternatively ground and unground or open pin 2 and thereby derive information for some other device such as a microprocessor or microcomputer of module 8 and game cartridge 11. As will be apparent to those skilled in the art, the module 8 and game cartridge 11 comprise means to send out trigger pulses at a predetermined interval or intervals. When each pulse arrives at the timing device 114, pin 2 opens or becomes ungrounded, and drain current from the field effect device 100 begins to charge the capacitor 112 to thereby increase the voltage at pin 2. When pin 2 voltage reaches two thirds the voltage coming out of the computer module 8 at V1, pin 2 is regrounded and the timing device 114 sends an echoing pulse back to the cartridge means. The time required to charge capacitor 112 when pin 2 is open is inversely proportional to the drain current of the field effect device 100, or directly proportional to the sum of the resistor 110 and the equivalent resistance of device 100 and resistor 102. The resistor 102 provides for a maximum charge time which is preferably less than the minimum expected time between the trigger pulses sent to the timing device 114. Thus the time interval between a trigger pulse and an echoing pulse gets smaller as the ability of the device 100 to conduct current increases, the gate G voltage of device 100 decreases, the base current of the transistor 92 increases, and the tuned circuit capacitance of transistor 60 increases in response to the presence of a human hand in the defined field of antenna 18. In this manner, the software system of module 8 and cartridge 11 is able to interrogate conditions at antenna 18.

FIG. 5 is a block diagram of the preferred embodiment of the invention depicting a sensing and signalling means such as anntenae 18, 30 and 38 for use in controlling movement of an element such as element 28 in two directions such as along the x-axis 26 and the y-axis 36, and for giving the appearance of movement of element 28 along the z-axis 44. The components and electrical coupling of antennae 18, 30 and 38 are the same as the components and coupling of antenna 18 of FIGS. 3 and 4 and therefore the description thereof will not be repeated. However, it should be noted that antenna 18 is coupled to control interface 20 by cable 22 which couples antenna 18 to the detuneable oscillator 52, antenna 30 is coupled to control interface 20 by cable 32 which couples antenna 30 to the detuneable oscillator $52_1$, and antenna 38 is coupled to control interface 20 by cable 40 which couples antenna 38 to the detuneable oscillator 52₁₁. Components for use with antennae 30 and 38 corresponding to similar components for use with antenna 18 are numbered in FIG. 5 with primes and double primes to simplify the block diagrams. In the embodiment of FIG. 5, antenna 18 is coupled to the timing device 114 at pin 2, antenna 30 is coupled to the timing device 114 at pin 15 and antenna 38 is coupled to the timing device 114 at pin 10.

In the preferred embodiment, component 60 is a PNP transistor, type No. MPS638 made by Motorola, component 92 is a NPN transistor, type No. MPS6566 made by Motorola, and component 100 is a P channel field effect transistor, type No. 2N5461 made by Motorola. The ratings of resistors 62, 64, 72, 76, 102 and 110 are 33,000 ohms, 47,000 ohms, 330 ohms, 4700 ohms, 150,000 ohms, and 100 ohms, respectively. Variable resistor 74 has a rating of 0 to 5000 ohms and variable resistor 94 has a rating of 0 to 1 megohm. The ratings of capacitors 68, 80, 88, 96 and 112 are 0.01 micro farad, 4.7 pico farads, 4.7 pico farads, 0.1 micro farad, and 0.022 micro farad, respectively. Capacitors 70 and 84 each have a rating of either 470 pico farads or 1000 pico farads. Adjustable capacitor 86 has a rating of 200 to 400 pico farads. Components 66 and 82 are fixed coils each of which has a rating of approximately 100 or 150 micro henrys. Component 90 is a diode, type No. 1N34A made by Motorola. The antenna is sized to give a capacitance range of 0 to 30 pico farads. Switch 122 is a single pole-single throw switch, and component 120 is a 9 volt D.C. battery. Conductor 24 comprises conductors 24₁, 24₁₁ and 24₁₁₁ which allow the control interface 20 to be coupled by a standard 16 pin connector in a known manner to the Apple II Plus Computer 8 as depicted in the drawings. The voltage coming out of the computer at V1 is +5 VD.C. and the voltage present at the positive side V2 of battery 120 is +14 VD.C.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A control interface between a moveable physical object and a machine comprising:
   (a) means for sensing and signalling any movement of said physical object in any direction in a defined field, said defined field being indentified by a plurality of antenna surfaces at least one surface of said plurality having a first field associated therewith which extends outwardly therefrom to form a region for sensing and signalling movement of said object in an X-dimension, at least another surface of said plurality having a second field associated therewith which extends outwardly therefrom to form a region for sensing and signalling movement of said object in a Y-dimension, and at least one other surface of said plurality having a third field associated therewith which extends outwardly therefrom to form a region for sensing and signalling movement of said object in a Z-dimension, said first, second and third fields being independent of each other and yet merging to form a common defined field, said sensing and signalling of movement of said object in said common defined field in any of said dimensions occurring without any physical contact of said object with any of said surfaces, and said plurality of surfaces being positioned to permit said object to be inserted into and removed from said common defined field;
   (b) Means coupled to said at least one surface for receiving said signalling which is representative of said movement of said object in said X-dimension, said receiving means emitting a first operating frequency in a radio frequency range;
   (c) means coupled to said at least another surface for receiving said signalling which is representative of said movement of said object in said Y-dimension, said receiving means emitting a second operating frequency in a radio frequency range;
   (d) means coupled to said at least one other surface for receiving said signalling which is representative of said movement of said object in said Z-dimension, said receiving means emitting a third operating frequency in a radio frequency range, said first, second and third operating frequencies not interfering with each other during the presence of said object in said common defined field;
   (e) means coupled to each of said receiving means for detecting the position of said object relative to the boundaries of said common defined field; and,
   (f) means coupled to said detecting means for producing an input signal to said machine to move an element of said machine in an amount proportional to said object movement.

2. The control interface of claim 1 wherein said first operating frequency is in a first radio frequency range, said second operating frequency is in a second radio frequency range which differs from said first range, and said third operating frequency is in a third radio frequency range which differs from said first and said second ranges.

3. The control interface of claim 1 wherein each of said receiving means comprises a pair of radio frequency emitting members, one of said members of each of said pairs being detuneable to allow a change of said one member's frequency, and production of a difference signal by said detuneable member, in response to said movement of said physical object in said field associated with the antenna surface to which said receiving means is coupled.

4. The control interface of claim 1 wherein at least one of said antenna surfaces comprises a plate-like structure.

5. The control interface of claim 1 wherein said producing means moves said element in a first direction identified by said X-dimension and in a second direction identified by said Y-dimension, and allows for simulation of movement of said element in a third direction identified by said Z-dimension.

6. The control interface of claim 3 wherein said detecting means further comprises means for detecting and amplifying said difference signal, and said producing means adapts said amplified difference signal to control said element.

7. The control interface of claim 3 wherein each of said members is an oscillator.

8. The control interface of claim 1 wherein each antenna surface is disposed at an angle of 90° relative to the other antennae surfaces.

9. The control interface of claim 1 wherein said producing means also moves said element of said machine in the same direction as said object movement.

10. The control interface of claim 2 wherein said producing means also moves said element of said machine in the same direction as said object movement.

11. The control interface of claim 3 wherein said producing means also moves said element of said machine in the same direction as said object movement.

* * * * *